(12) United States Patent
Brunner et al.

(10) Patent No.: US 7,397,964 B2
(45) Date of Patent: Jul. 8, 2008

(54) GAUSSIAN BLUR APPROXIMATION SUITABLE FOR GPU

(75) Inventors: Ralph Brunner, Cupertino, CA (US); Kok Chen, Sunnyvale, CA (US); John Harper, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 932 days.

(21) Appl. No.: 10/876,039

(22) Filed: Jun. 24, 2004

(65) Prior Publication Data

US 2005/0286794 A1    Dec. 29, 2005

(51) Int. Cl.
*G06K 9/40* (2006.01)
(52) U.S. Cl. .................. 382/264; 382/265; 348/597
(58) Field of Classification Search .................. 382/264
See application file for complete search history.

(56) References Cited

U.S. PATENT DOCUMENTS

| | | | | |
|---|---|---|---|---|
| 5,148,497 A | * | 9/1992 | Pentland et al. | 382/249 |
| 5,388,201 A | | 2/1995 | Hourvitz et al. | 345/794 |
| 5,436,672 A | * | 7/1995 | Medioni et al. | 348/591 |
| 5,467,404 A | * | 11/1995 | Vuylsteke et al. | 382/274 |
| 5,490,246 A | | 2/1996 | Brotsky et al. | 395/161 |
| 5,694,447 A | * | 12/1997 | Ito | 378/62 |
| 5,793,376 A | | 8/1998 | Tanaka et al. | 345/582 |
| 5,832,055 A | * | 11/1998 | Dewaele | 378/62 |
| 5,933,148 A | | 8/1999 | Oka et al. | 345/427 |
| 5,949,409 A | | 9/1999 | Tanaka et al. | 345/549 |
| 6,006,231 A | | 12/1999 | Popa | 707/101 |
| 6,031,937 A | | 2/2000 | Graffagnino | 382/236 |
| 6,075,543 A | | 6/2000 | Akeley | 345/539 |
| 6,166,748 A | | 12/2000 | Van Hook et al. | 345/522 |
| 6,211,890 B1 | | 4/2001 | Ohba | 345/506 |

(Continued)

FOREIGN PATENT DOCUMENTS

| | | |
|---|---|---|
| EP | 548 586 A | 6/1993 |
| EP | 0 694 879 | 1/1996 |
| EP | 1 383 080 | 1/2004 |
| EP | 0 972 273 B1 | 3/2004 |
| WO | WO 98/45815 | 10/1998 |
| WO | WO 02/09039 A | 1/2002 |
| WO | WO 2004-027707 A2 | 4/2004 |

OTHER PUBLICATIONS nVIDIA, "Cg—Teaching Cg" Power Point Presentation, Author and date unknown.

(Continued)

*Primary Examiner*—Matthew C Bella
*Assistant Examiner*—Sath V. Perungavoor
(74) *Attorney, Agent, or Firm*—Wong, Cabello, Lutsch, Rutherford & Brucculeri, L.L.P.

(57) ABSTRACT

A Gaussian blur approximation is applied to an image by repeated down-sampling operations followed by an up-sample operation. By using a truncated Gaussian filter as the down-sample filter, the frequency spectrum removed during down-sampling operations closely approximates the frequency spectrum lost during a true Gaussian blur operation. While any "good" up-sample filter may be used, up-sampling via linear interpolation may be especially beneficial in systems having a dedicated graphics processing unit. One benefit of the described technique is that it is computationally less costly to implement than a Gaussian blur. Another benefit is that this computational benefit increases as the size of the blur increases—becoming significant even for small blurs. Yet another benefit of the invention is that a judicious selection of pixel address to convolve with the filter leads to substantially reduced number of texture lookups required to effect a convolution.

31 Claims, 2 Drawing Sheets

U.S. PATENT DOCUMENTS

| | | | | |
|---|---|---|---|---|
| 6,246,418 | B1 | 6/2001 | Oka | 345/441 |
| 6,249,315 | B1* | 6/2001 | Holm | 348/251 |
| 6,272,558 | B1 | 8/2001 | Hui et al. | 709/328 |
| 6,356,652 | B1* | 3/2002 | Vuylsteke | 382/132 |
| 6,369,823 | B2 | 4/2002 | Ohba | 345/506 |
| 6,369,830 | B1 | 4/2002 | Brunner et al. | 345/629 |
| 6,411,301 | B1 | 6/2002 | Parikh et al. | 345/522 |
| 6,421,058 | B2 | 7/2002 | Parikh et al. | 345/522 |
| 6,424,348 | B2 | 7/2002 | Parikh | 345/522 |
| 6,426,755 | B1* | 7/2002 | Deering | 345/581 |
| 6,452,600 | B1 | 9/2002 | Parikh et al. | 345/522 |
| 6,456,290 | B2 | 9/2002 | Parikh et al. | 345/522 |
| 6,466,218 | B2 | 10/2002 | Parikh et al. | 345/522 |
| 6,489,963 | B2 | 12/2002 | Parikh et al. | 345/522 |
| 6,526,174 | B1 | 2/2003 | Graffagnino | 382/236 |
| 6,571,328 | B2 | 5/2003 | Liao et al. | 712/35 |
| 6,577,317 | B1 | 6/2003 | Duluk, Jr. et al. | 345/506 |
| 6,580,430 | B1 | 6/2003 | Hollis et al. | 345/473 |
| 6,609,977 | B1 | 8/2003 | Shimizu et al. | 463/36 |
| 6,614,444 | B1 | 9/2003 | Duluk, Jr. et al. | 345/581 |
| 6,618,048 | B1 | 9/2003 | Leather | 345/422 |
| 6,636,214 | B1 | 10/2003 | Leather et al. | 345/422 |
| 6,639,595 | B1 | 10/2003 | Drebin et al. | 345/426 |
| 6,664,958 | B1 | 12/2003 | Leather et al. | 345/422 |
| 6,664,962 | B1 | 12/2003 | Komsthoeft et al. | 345/426 |
| 6,697,074 | B2 | 2/2004 | Parikh et al. | 345/522 |
| 6,707,462 | B1 | 3/2004 | Peercy et al. | 345/619 |
| 6,717,599 | B1 | 4/2004 | Olano | 345/853 |
| 6,792,575 | B1* | 9/2004 | Samaniego et al. | 715/202 |
| 6,999,634 | B2* | 2/2006 | Hong | 382/275 |
| 7,065,255 | B2* | 6/2006 | Chen et al. | 382/260 |
| 7,068,851 | B1* | 6/2006 | Berkner | 382/261 |
| 7,177,481 | B2* | 2/2007 | Kaji | 382/265 |
| 7,245,400 | B2* | 7/2007 | Schuppan | 358/3.2 |
| 2001/0013895 | A1* | 8/2001 | Aizawa et al. | 348/222 |
| 2002/0093516 | A1 | 7/2002 | Brunner et al. | 345/629 |
| 2002/0118217 | A1 | 8/2002 | Fujiki | |
| 2002/0118875 | A1* | 8/2002 | Wilensky | 382/173 |
| 2002/0159648 | A1* | 10/2002 | Alderson et al. | 382/260 |
| 2002/0174181 | A1 | 11/2002 | Wei | 709/204 |
| 2002/0176113 | A1* | 11/2002 | Edgar | 358/3.27 |
| 2003/0123739 | A1 | 7/2003 | Graffagnino | 382/236 |
| 2003/0174136 | A1 | 9/2003 | Emberling et al. | |
| 2003/0223622 | A1* | 12/2003 | Simon et al. | 382/118 |
| 2005/0232507 | A1* | 10/2005 | Zimmer | 382/264 |
| 2007/0183683 | A1* | 8/2007 | Ricard et al. | 382/264 |

OTHER PUBLICATIONS

Shantzis, "*A Model for Efficient and Flexible Image Computing*" Computer Graphics Proceedings, Annual Conference Series, 1994, pp. 147-154.

Akeley, et al., "*Real-Time Graphics Architecture*" http://www.graphics.stanford.edu/courses/cs448a-01-fall, The OpenGL® Graphics System—CS448 Lecture 15, Fall 2001, pp. 1-20.

Gelder, et al., "Direct Volume Rendering with Shading via Three-Dimensional Textures" Computer Science Dept., Univ. of California, Santa Cruz, CA 95064.

Elliott, "Programming Graphics Processors Functionally,".

Segal, et al., "The OpenGL® Graphics System: A Specification (Version 1.5)" Copyright © 1992-2003 Silicon Graphics, Inc., Oct. 30, 2003.

International Search report dated Jul. 27, 2005 (PCT/US 05/008804; 119-0033WO).

International Search report dated Aug. 8, 2005 (PCT/US 05/008805; 119-0034WO).

Haeberli, P. et al., "The Accumulation Buffer: Hardware Support for High-Quality Rendering," Computer Graphics, New York, NY, vol. 24, No. 4, Aug. 1, 1990, pp. 309-318.

* cited by examiner

GAUSSIAN BLUR APPROXIMATION SUITABLE FOR GPU

BACKGROUND

The invention relates generally to the field of computer graphics processing and, more particularly, to an improved means for generating a Gaussian blur. The subject matter of the invention is generally related to the following jointly owned and co-pending patent applications: "Improved Blur Computation Algorithm" by Mark Zimmer, Ser. No. 10/826, 596; and "System for Optimizing Graphics Operations" by John Harper, Ralph Brunner, Peter Graffagnino, and Mark Zimmer, Ser. No. 10/825,694, each incorporated herein by reference in its entirety.

In the object-oriented programming context of most modern graphics processing systems, there are generally five types of objects available to a programmer: images; filters; contexts; vectors; and textures. An image is generally either the two dimensional result of a rendering operation (a bitmap or raster image) or a vector representation of the same. A filter is generally a collection of one or more high-level functions that are used to affect images. A context is a space, such as a defined place in memory where the result of a filtering operation is stored. A vector is a collection of floating point numbers, for example, the four dimensional vector used to describe the appearance of a pixel (red, blue, green and transparency levels). A texture is a representation or description of an object's surface and may describe properties such as, for example, the surface's smoothness, coarseness, regularity, color, brightness and transparency. Each of these definitions is somewhat exemplary in nature, and the foregoing definitions should not be considered exclusive or otherwise overly restrictive.

Most relevant to the purposes of the present invention are images and filters. A relatively common filter applied to images is a blur. Blur filtering is used to generate shadows, depict cinematic motion, defocus an image, sharpen an image, render clean line art, detect edges and many other professional photographic effects. Well-known blur filters include, but are not limited to, the: Gaussian blur (simulates shooting a subject with an out-of-focus lens); box blur (changes the color value of each pixel based on the pixels next to it in the vertical and horizontal directions to quickly create a blur effect); channel blur (used to produce a blur in one or more individual image channels—i.e., red, green, blue and transparency channels); dolly blur (creates blurs that increase radially outwards from a defined center point); roll blur (simulate the blur created when a camera or object is spun on its own axis); and motion blurs (simulate the blur created by fast-moving objects).

In practice, the Gaussian blur provides the most realistic (highest quality) and visually pleasing blur effect. For these and other reasons, Gaussian blurs are among the most popular image processing operations used. Unfortunately, implementation of Gaussian blurs in a conventional manner are computationally intensive operations, requiring approximately 2 w multiply-adds per pixel, where "w" represents the radius of the blur. To avoid this computational cost, it is common to use repeated box or IIR (infinite impulse response) blurs—both of which are computationally less expensive.

Many modern computer systems include dedicated graphics hardware—programmable graphics processing units ("GPUs"). One type of GPU program, referred to as fragment programs, allow programmers to directly compute an image by specifying the program that computes a single pixel of that image. This program is run in parallel, operating on many pixels at once, by the GPU to produce the result image. Because multiple pixels are processed at a single time by dedicated hardware, GPUs can provide dramatically improved image processing capability (e.g., speed) over methods that relied on a computer system's central processing unit ("CPU") which is also responsible for performing other system and application duties.

Because Gaussian blurs form the cornerstone of many image processing algorithms, it has become important to compute them efficiently. As noted above, one means of generating a Gaussian-like blur is to cascade a series of box blur operations. Unfortunately, cascading box blurs cannot be efficiently implemented by GPUs because such operations require the ability to sum values across a number of rows and/or columns—current GPU architectures do not inherently support such operations and, as a result, are inefficient to implement. Thus, it would be beneficial to provide a mechanism to efficiently approximate Gaussian blurs using GPU hardware.

SUMMARY

In one embodiment, the invention provides a method to generate high-fidelity Gaussian blur approximations by down-sampling an image a with a truncated Gaussian filter a specified number of times and then up-sampling the reduced image back to its original size. Up-sampling may be provided by a distortionless filter (e.g., a sinc filter) or other computationally inexpensive technique such as linear interpolation. By properly selecting the Gaussian down-sampling filter, the frequency spectrum removed during down-sampling operations closely approximates the frequency spectrum filtered out during a true Gaussian blur operation.

In another embodiment, a first truncated Gaussian filter is used to perform a determined number of down-sample operations and a second truncated Gaussian filter is used to blur the down-sampled image a final time. Following the final blur operation, the resulting image is up-sampled to return it to the size of the original image. A benefit of this approach is that the final blur results in an image that is sufficiently smooth that linear interpolation may be used as the up-sampling technique. This can be particularly beneficial in implementations using a graphics processing unit.

In yet another embodiment of the invention, a judicious selection of pixel addresses (representing the pixel values convolved with the truncated Gaussian filter) can lead to a substantial reduction in the number of texture lookups, pairwise multiply operations and addition operations necessary to effect the convolution.

One benefit of the invention is that it is computationally less costly to implement than a conventional Gaussian blur. Another benefit is that this computational benefit increases as the amount or level of the desired blur increases, becoming significant even for relatively small blurs. Yet another benefit is that methods in accordance with the invention are especially well suited to implementation using dedicated graphical processing hardware. Methods in accordance with the invention may be stored in any media that is readable and executable by a computer system or other programmable control device.

DETAILED DESCRIPTION

Methods and devices in accordance with the invention approximate a Gaussian blur operation by down-sampling an image a specified number of times and then up-sampling the reduced image back to its original size. By properly selecting the down-sampling filter, the frequency spectrum removed (filtered out) during down-sampling operations closely approximates the frequency spectrum filtered out during a true Gaussian blur operation, thereby effecting a Gaussian blur. One benefit of the invention is that it is computationally less costly to implement than a conventional Gaussian blur. Another benefit is that this computational benefit increases as the blur radius (i.e., the amount of desired blur) increases—becoming significant even for relatively small blurs. Yet another benefit is that methods in accordance with the invention are especially well suited to implementation using dedicated graphical processing hardware, e.g., GPUS.

The following descriptions are presented to enable any person skilled in the art to make and use the invention as claimed and are provided in the context of the particular examples discussed below, variations of which will be readily apparent to those of ordinary skill in the art. Accordingly, the claims appended hereto are not intended to be limited by the disclosed embodiments, but are to be accorded their widest scope consistent with the principles and features disclosed herein.

Figure 1:
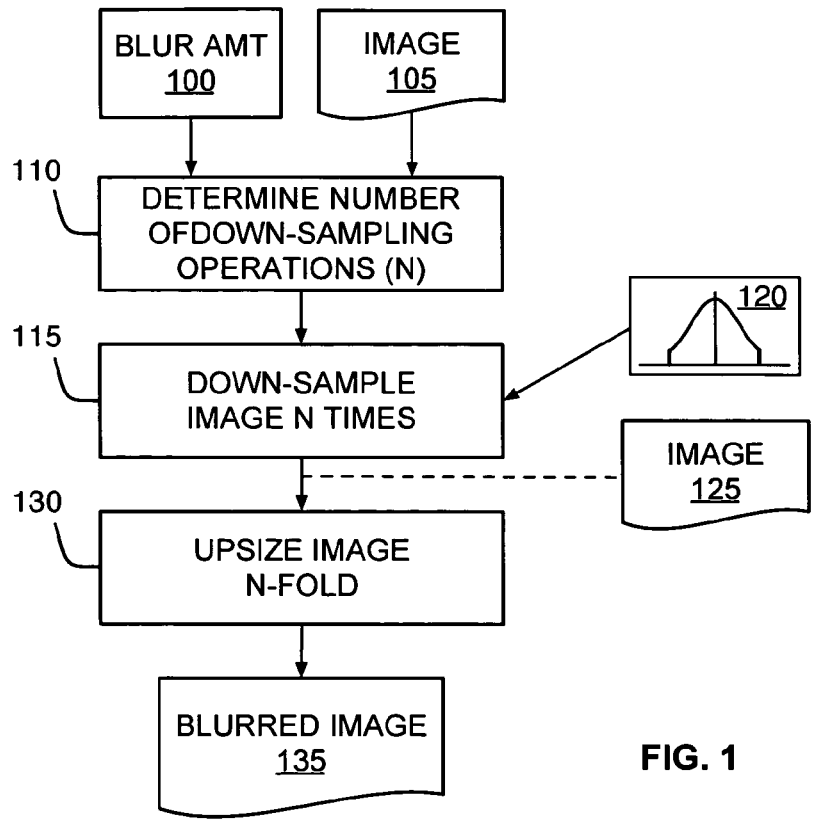
FIG. 1 shows, in flowchart format, a method to generate a Gaussian blur in accordance with one embodiment of the invention.

Referring to FIG. 1, in the context of a graphics or image processing application where a user specifies the amount of Gaussian blur (100) to apply to a particular image (105), methods in accordance with one embodiment of the invention first determine the number of down-sample operations needed to obtain the desired blur (block 110). As will be discussed below, the number of down-sample operations is a function of, among other parameters, the desired amount of blur and the down-sample filter (e.g., its standard deviation). Image 105 is then down-sampled the requisite number of times (block 115) using truncated Gaussian filter 120 to generate intermediate blurred image 125. One of ordinary skill in the art will recognize that each down-sample operation first blurs the image (i.e., convolves image 105 with filter 120) and then reduces its size by a specified amount. Once the determined number of down-sample operations are complete, image 125 is up-sampled (typically in a single step or operation) an amount to return the image to its original size (block 130). Blurred image 135 represents a Gaussian blurred version of initial image 100. In this embodiment, up-sample operation 130 may be performed by any means that does not introduce excessive distortion or additional blur. For example, up-sample operation 130 could be performed by an "ideal" filter such as a sinc filter, where the sinc function is defined as $\sin(\pi x)/(\pi x)$. Alternatively, up-sample operation 130 may be implemented as a linear interpolation function. The latter embodiment may be particularly useful in embodiments that use a dedicated GPU as most have dedicated interpolation hardware making such operations both very fast and, from a software point of view, cost free.

As noted above, down-sampling operations in accordance with the invention utilize truncated Gaussian filters—where the filter's distribution is truncated at $\pm n\pi_d$, where $\sigma_d$ represents the down-sample Gaussian filter's standard deviation. It will be recognized that for a given down-sample filter standard deviation, the larger the value of n the higher the fidelity of the resulting blur (i.e., the more closely a true Gaussian blur is effected) but the more computationally intensive the down-sample operation. Accordingly, the value of n is a matter of design choice and is chosen to limit the distortion introduced by the Gaussian filter to less than a specified-level. For example, letting n=2 limits the error introduced by the Gaussian down-sample filter to approximately 4.6% while a value of 2.2 limits the error to approximately 2.8%.

In accordance with FIG. 1, the total number of down-sample operations (N) is selected so that the sum of the variance introduced by convolving initial image 105 with truncated Gaussian filter 120 N-times generates image 125 having the user-specified variation. This may be stated mathematically as follows:

$$V_{user} = \sum_{j=0} V_d r^{2j}, \text{ where} \qquad \text{EQ. 1}$$

$V_{user}$ represents the amount of Gaussian blur specified by a user (expressed in terms of variance), $V_d$ represents the variance of truncated Gaussian filter 120, r represents the down-sample factor, and j runs from 1 to some value—the ultimate value being N. With respect to r, if a down-sample operation reduces the size of an image (pixel count) to one-half its original size, r equals 2. If a down-sample operation reduces the size of an image to one-third its original size, r equals 3, and so forth.

In the embodiment of FIG. 1, the down-sample Gaussian filter's variance ($V_d$) is selected such that it is: (1) not so small as to introduce visual artifacts; (2) not so large as to exceed the implementing GPU's capabilities; and (3) allows the total variance of the repeated down-sampling operations to just match the user-specified variance. It has been found that a filter having a standard deviation of less than approximately 0.75 r introduces excessive visual distortion/artifacts, where r is the down-sampling ratio as introduced above.

Based on these constraints, EQ. 1 may be used to generate a series of equations in which $V_d$ is the only unknown value. That solution yielding the lowest number of down-sampling operations, while meeting the above criteria, is generally selected as "establishing" the down-sample filter. Table 1 illustrates the calculations to determine $V_d$ given a user-specified blur level of 200 ($V_{user}$=200) and a down-sample ratio of 2 (r=2). It appears that five down-sample operations are to many as the calculated $\sigma_d$ (0.78) is smaller than the lower-bound given by 0.75 r (1.5). Any of the remaining solutions would be acceptable if the system implementing the filter (e.g., a GPU) could represent the required filter (recall, the filter extends to $\pm n\sigma_d$, where n is a fidelity factor typically, between 1 and 4). In practice, and for this example, many commercially available GPUs can support a blur operation in accordance with the invention employing either 3 or 4 down-sample operations.

TABLE 1

Illustrative Down-Sample Count Determination

| j | N | $V_d$ | $\sigma_d$ |
|---|---|---|---|
| 0 | 1 | $V_d = \frac{V_{user}}{1} = 200$ | 14.14 |
| 1 | 2 | $V_d = \frac{V_{user}}{5} = 40$ | 6.32 |
| 2 | 3 | $V_d = \frac{V_{user}}{21} = 9.5$ | 3.08 |
| 3 | 4 | $V_d = \frac{V_{user}}{85} = 2.3$ | 1.52 |
| 4 | 5 | $V_d = \frac{V_{user}}{341} = 0.6$ | .78 |

In accordance with another embodiment of the invention, two (2) truncated Gaussian filters are used. The first truncated Gaussian filter is used during N-1 down-sample operations—that is, operations that both blur (convolve) and down-sample (reduce) the image. The second truncated Gaussian filter is used for a final blur operation without further reducing or down-sampling the image. This approach permits a predetermined filter be used (having a known standard deviation) during the initial N-1 down-sampling operations. The second truncated Gaussian filter's standard deviation (or variance) is then selected to match the user-specified variance in a manner similar to that described above and illustrated in Table 1.

Figure 2:
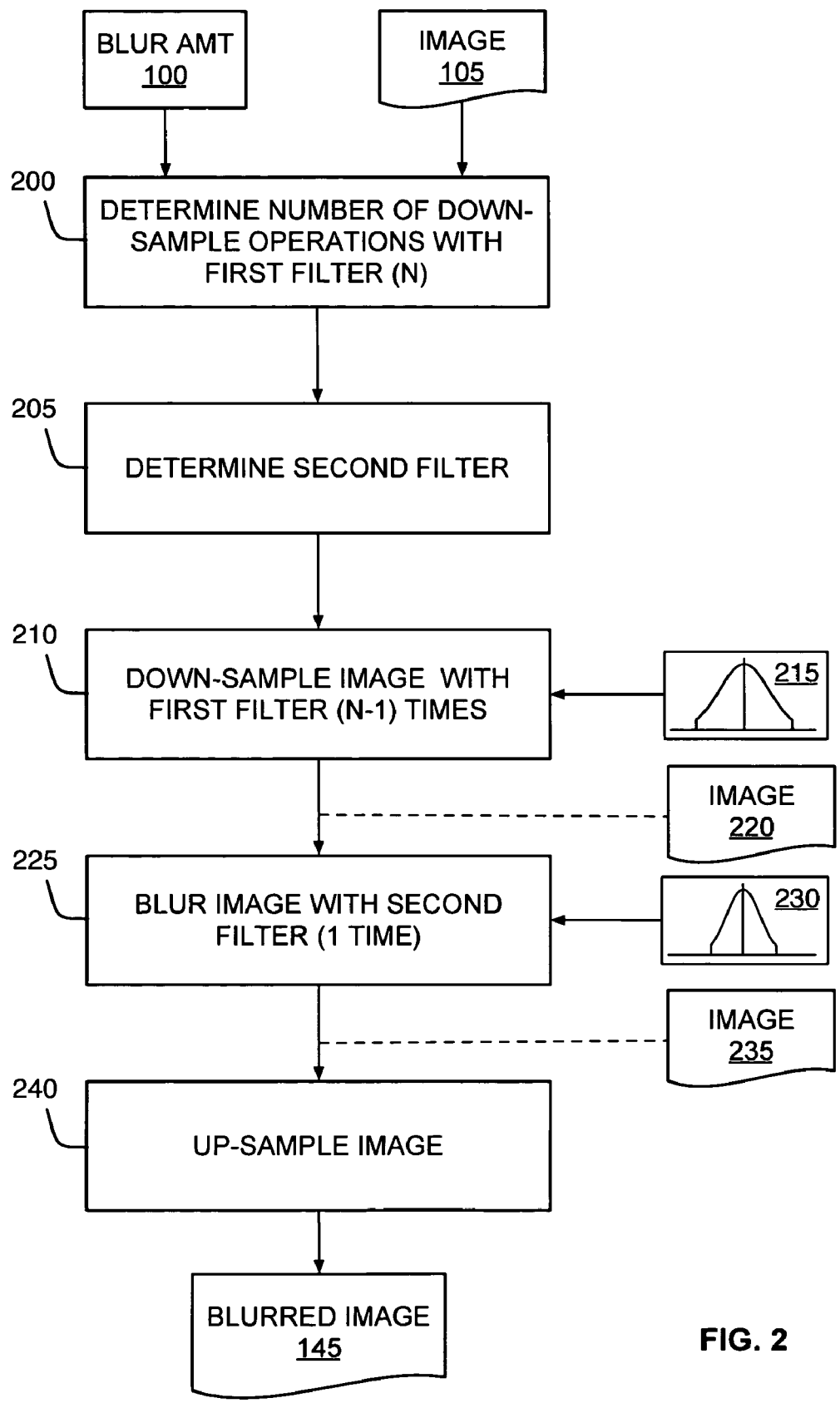
FIG. 2 shows, in flowchart format, a method to generate a Gaussian blur in accordance with another embodiment of the invention.

Referring to FIG. 2, user-specified blur amount 100 (i.e., $V_{user}$) is used to determine the number of down-sample operations to apply to image 105 using a specified or predetermined filter (block 200). Expanding EQ. 1 above, the number of down-sample operations is the highest number of operations that provides a total variance less than that specified by the user (100). The difference between the total variance introduced by down-sampling operations in accordance with block 200 and that specified by the user (100) is the amount the second truncated Gaussian filter must provide. Using this value in EQ. 1 as the $N^{th}$ operation, determines the standard deviation of the second filter (block 205). After the second filter is determined, image 105 is down-sampled N-1 times (block 210) with first filter 215 to generate intermediate image 220. Image 220 is then convolved (block 225) with second filter 230 to generate intermediate image 235. Image 235 is then up-sampled (block 240) to produce output image 145. As before, up-sample operations in accordance with block 240 may use any distortionless filter or, alternatively, may be implemented via a linear interpolation process. The latter technique being preferred on implementations using a GPU.

By way of example, consider the case in which a user specifies a variance of 200 ($V_{user}$=200), where the first or predetermined filter has a standard deviation of 2.3 ($\sigma_d$=2.3; $V_d$=5.29) and which is truncated at 2.2σ(n=2.2), and where the down-sampling factor is 2 (r=2). Table 2 expands EQ. 1 based on these values as shown below.

TABLE 2

Example Determination in Accordance with FIG. 2

| j | N | $V_{total}\left(\sum_{j=0} V_d r^{2j}\right)$ | $V_{user} - V_{total}$ |
|---|---|---|---|
| 0 | 1 | 5.29 | 194.71 |
| 1 | 2 | 26.45 | 173.55 |
| 2 | 3 | 111.09 | 88.91 |
| 3 | 4 | 449.65 | −249.65 |

As Table 2 illustrates, for first truncated Gaussian filter 215 as specified above, three (3) down-sample operations are required. The variance that remains to be introduced to meet the user's requirement is approximately 88.91. Thus, second truncated Gaussian filter 230 must contribute a variance of 88.91 during a fourth operation. In accordance with EQ. 1, the variance ($V_b$) and standard deviation ($\sigma_b$) of second filter 230 to meet this need during a 4th filtering operation is given by $88.91 = V_b r^{2(3)} = 64 V_b$, such that $V_b$=1.389 and $\sigma_b$=1.179.

In the context of this example and FIG. 2, with both filter's now defined, the acts of blocks 200-225 may be performed. Following the final blur operation of block 225, up-sample operation 240 must return image 235 to the same size as input image 105. In this example, image 235 must be up-sampled 8-fold. In general, filtered image 235 (or image 125 of FIG. 1) must by up-sampled by a factor of $r^N$, where r is the down-sample ratio and N is the number of down-sample operations performed in accordance with blocks 115 and 210.

In one embodiment in accordance with FIG. 2, first truncated Gaussian filter 215 is a 10-element, one-dimensional filter and second truncated Gaussian filter 230 is a 15-element, one-dimensional filter. Further, because Gaussian convolutions are separable, image 100 may be processed in two independent steps. The first step performing vertical down-sampling and blur operations. The second step performing horizontal down-sampling and blur operations.

One benefit of generating Gaussian blurs in accordance with the invention is that it is computationally more efficient than a true Gaussian blur. For example, it is known that a true Gaussian blur requires more than approximately 2w multiply-add operations per pixel, where w represents the radius of the blur operation—that is, the value specified by the user (blur amount 100). Thus, the computational load of a true Gaussian blur increases linearly with the amount of the desired blur. In contrast, methods in accordance with the invention require only approximately 2k multiply-add operations per pixel, where k is the width of the filter used and, as such, is a fidelity parameter that is independent of the amount the image is blurred.

The computational cost of a Gaussian blur in accordance with the invention can be represented as follows:

$$MA_{total} = MA_{down} + MA_{blur} + MA_{up},\qquad \text{EQ. 2}$$

where $MA_{total}$ represents the total number of multiply-add operations per pixel, $MA_{down}$ the number of multiply-add operations per pixel during down-sampling operations (e.g., block 115 or 210), $MA_{blur}$ the number of multiply-add operations per pixel during blur operations (e.g., block 225) and $MA_{up}$ the number of multiply-add operations per pixel during up-sampling operations (e.g., block 130 or 240). $MA_{down}$ is given by $$\sum_{j=1}^{N} \frac{FD}{r^j},$$

where FD is the number of elements in the down-sample filter, r is the down-sample ratio and N is the total number of down-sample operations performed. It is significant to note that, for r>1 (practically speaking, for any down-sampling ratio), $MA_{down}$ is always less than $FD.MA_{blur}$ is given by $$\frac{FB}{r^N},$$

where FB is the number of elements in the blur filter and N is as given above. $MA_{up}$ is, for linear interpolation techniques, 3. (If a different up-sample technique were to be used such as a sinc filter, the number of multiply-adds required by that technique would be used for $MA_{up}$.)

For the example described above with respect to FIG. 2 and Table 2, in which the down-sample ratios r is 2, the down-sample filter had 10 elements (FD=10), the blur filter had 15 elements (FB=15), and the up-sample operation utilized linear interpolation, the computational cost to generate the user-specified blur of 200 is:

$$\text{cost} = \left[\left(\frac{1}{2}(10) + \frac{1}{4}(10) + \frac{1}{8}(10) + \frac{1}{8}(15)\right) \times 2\right] + 3 = 24.25,$$

where the factor of 2 is required because the image is being processed first in one dimension (vertical) and then in a second dimension (horizontal). In contrast, a Gaussian blur of variance 200 using prior art techniques requires approximately 85 multiply-add operations per pixel. (This assumes a one-dimensional Gaussian filter distribution truncated at ±1.5 standard deviations. With these parameters, the cost of a prior art Gaussian blur is given by: $(2 \times 1.5 \times \sqrt{200})2 \approx 84.8$, where the final factor of 2 accounts for performing two filtering passes. A first pass filters the image in the vertical dimension and a second pass filters the image in the horizontal dimension.) As this comparison clearly shows, the computational cost of performing a prior art Gaussian blur is proportional to the size of the blur.

In another aspect of the invention, a GPU's ability to perform linear interpolation may be utilized to reduce the number of texture (pixel value) lookups required to perform a convolution. In a prior art technique, the convolution result for a single pixel is given by:

$$\text{Result} = (P_0 \times F_0) + (P_1 \times F_1) + L + (P_{m-1} \times F_{m-1}), \quad \text{EQ. 3}$$

where $P_0$ is the value of the 0th image pixel, $F_0$ is the value of the 0th filter element ... $P_{m-1}$ is the value of the (m-1)st image pixel and $F_{m-1}$ is the value of the (m-1)st filter element. (In this example, an m-element one-dimensional filter is used.) As can be clearly seen from EQ. 3, convolution in accordance with the prior art requires m texture lookups, m multiply operations and (m-1) additions.

By utilizing a GPU's built-in (hardware) capability to linearly interpolate between two pixel values and further recognizing that any pixel value requested that does not align with a pixel's defined location (e.g., the pixel's mid-point) triggers this linear interpolation, the number of texture (pixel) lookup operations can be reduced by approximately one-half. A result of reducing the number of texture lookups is that the number of software-based multiply and add operations are similarly reduced.

Figure 3:
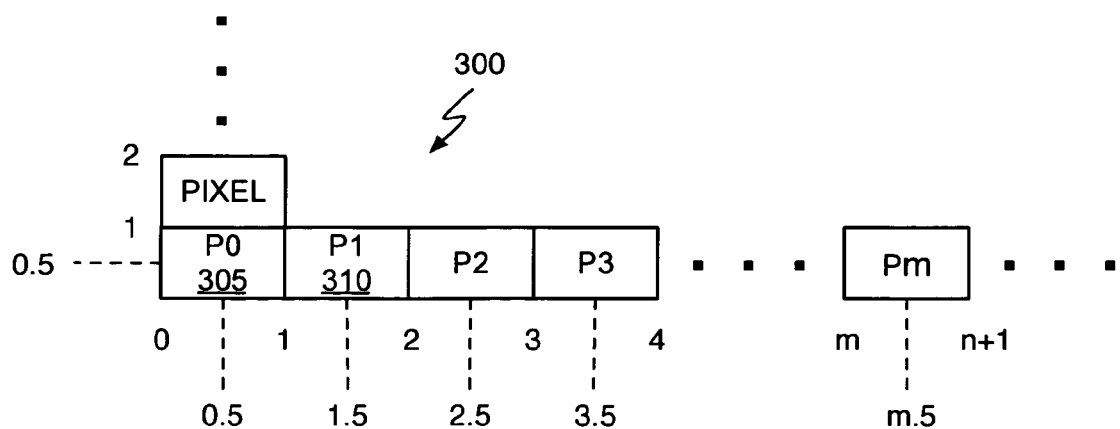
FIG. 3 shows the arrangement and labeling of a image's pixels' addresses in accordance with the OpenGL graphics standard.

Referring to FIG. 3, image 300 may be represented as a two-dimensional array of pixels. In one embodiment, based on the OpenGL® standard, each pixel's coordinate is defined by its mid-point. (OpenGL is a registered trademark of Silicon Graphics, Inc. of Mountain View, Calif.) Thus, the "address" of pixel $P_0$ 305 is (0.5, 0.5), the address of pixel $P_1$ 310 is (1.5, 0.5) and so forth. It will be recognized that if a texture lookup is performed on a location that is between two adjacent pixels, a GPU will return a value that results from the linear interpolation between the designated location and each adjacent pixel. This operation is performed by the GPU's hardware and is, therefore, extremely fast and cost-free (from a software or program standpoint). By way of example, if a texture lookup is performed on a location that is half-way between two adjacent pixels, say (1.0, 0.5) in FIG. 3, a GPU will return a value that is the linear interpolation of pixel $P_0$ 300 and $P_1$ 305. The value generated by this linear interpolation is precisely the operation espoused by EQ. 3. That is, by judiciously selecting the pixel locations to filter, convolution in accordance with the invention using a GPU may eliminate approximately half of all texture lookups and, as a result, nearly half of the required software multiply and add operations.

Assuming a one-dimensional horizontal filter operation involving an m-element filter, where m is even, election of the ith composite pixel location ($p_i$) is given by:

$$\left(x + 2i + \frac{F_{2i}}{F_{2i} + F_{2i+1}}, y\right), \text{ where} \quad \text{EQ. 4}$$

i is an integer than runs from 0 to m/2, x is the x-axis center-point for the first pixel to be filtered, $F_j$ represents the jth filter element value, and y represents the y-axis center point for the horizontal row of pixels to be filtered. Similarly, the ith composite filter coefficient value ($f_i$) with which to filter the ith composite pixel location ($p_i$) may be determined in accordance with the following:

$$f_i = F_{2i} + F_{2i+1}, \text{ where} \quad \text{EQ. 5}$$

i again runs from 0 to m/2.

Accordingly, the convolution of an image with an m-element one-dimensional filter is given by:

$$\text{result} = \sum_{i=0}^{\frac{m}{2}} f_i \times f(p_i), \text{ where} \quad \text{EQ. 6}$$

$f_i$ represents a composite filter value in accordance with FIG. EQ. 5, and $f(p_i)$ represents the value returned when a texture lookup operation is performed at composite pixel location $p_i$ as defined in EQ. 4. Thus, where the number of filter elements (m) is even, the number of texture lookups and multiplication operations is reduced by one-half and the number of add operations is reduced by slightly more than half.

Where the number of filter elements (m) is odd, the number of texture lookups and multiplication operations is one more than that identified in EQ. 6 to capture the "odd" image pixel and filter element that. Accordingly, for odd m, EQ. 6 can be modified as follows:

$$\text{result} = \left( \sum_{i=0}^{floor(\frac{m}{2})} f_i \times f(p_i) \right) + F_m P_m, \text{ where} \quad \text{EQ. 7}$$

floor(x) represents the floor function, returning an integer value that is not greater than the real-number division identified by x. Thus, where the number of filter elements used to convolve an image is odd, methods in accordance with the invention reduce the number of texture lookups and multiply operations by slightly less than one-half and the number of add operations by slightly more than one-half.

One of ordinary skill in the art will recognize that the texture lookup reduction scheme in accordance with the invention is applicable to those situations in which each filter element comprising a pair-wise combination have the same sign (that is, are either both positive or both negative). For example, as long as filter element values $F_{2i}$ and $F_{2i+1}$ have the same sign (for all values of i as constrained above), the technique described herein works.

It will be recognized that acts in accordance with FIGS. 1 and 2 may be performed by a programmable control device executing instructions organized into one or more program modules. A programmable control device may be a single computer processor, a special purpose processor (e.g., a graphics processing unit or "GPU"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A method to blur an image, comprising:
   obtaining an image, said image having an original size;
   receiving a blur-value indicating an amount to blur the image;
   determining a number of times to down-sample the image with a truncated Gaussian filter having a variance, based on the blur-value;
   down-sampling the image the determined number of times with the truncated Gaussian filter; and
   up-sampling the down-sampled image to return it to approximately the original size.

2. The method of claim 1, wherein the act of receiving a blur-value comprises receiving a user-specified blur-value.

3. The method of claim 1, wherein the act of determining a number of times to down-sample comprises selecting a value for the variance (V) such that the following equation is satisfied $$V_{value} = \sum_{j=0} V r^{2j}, \text{ where}$$

$V_{value}$ represents the blur-value, r represents a factor by which the image is reduced in size during each down-sample operation, and where j is an integer.

4. The method of claim 3, wherein the value of r is a value between approximately 2 and 8.

5. The method of claim 1, wherein the act of up-sampling comprises linearly interpolating the down-sampled image.

6. The method of claim 1, wherein the act of up-sampling comprises using a sinc-function filter.

7. The method of claim 1, wherein the truncated Gaussian filter is truncated at a value equal to $\pm n\sigma$, where a represents the square-root of the variance and n is a real number in a specified range.

8. The method of claim 7, wherein the specified range is between approximately 1 and approximately 4.

9. The method of claim 1, wherein the act of down-sampling is performed by a graphics processing unit.

10. The method of claim 9, wherein the act of up-sampling is performed by the graphics processing unit.

11. The method of claim 1, wherein the truncated Gaussian filter comprises a one-dimensional truncated Gaussian filter.

12. An image processing software application stored on a computer-readable medium comprising instructions for causing one or more programmable control devices to:
   identify an image, the image having an original size;
   specify a blur-value indicating an amount to blur the image;
   determine a number of times to down-sample the image with a truncated Gaussian filter having a variance, based on the blur-value;
   down-sample the image the determined number of times with the truncated Gaussian filter; and
   up-sample the down-sampled image to return it to approximately its original size.

13. The image processing software application of claim 12, wherein the instructions to down-sample comprise instructions to down-sample using a graphics processing unit.

14. The image processing software application of claim 13, wherein the instructions to up-sample comprise instructions to use the graphics processing unit.

15. The image processing software application of claim 12, wherein the truncated Gaussian filter comprises a one-dimensional truncated Gaussian filter.

16. A method to blur an image, comprising:
   obtaining an image having an original size;
   receiving a blur-value indicating an amount to blur the image;
   determining a number of times to down-sample the image with a first truncated Gaussian filter having a first variance, based on the blur-value;
   determining a second truncated Gaussian filter based on a second variance, the second variance being equal to the difference between the blur-value and the variance resulting from down-sampling the image the determined number of times;
   down-sampling the image the determined number of times with the first truncated Gaussian filter to generate a first intermediate image;
   convolving the first intermediate image with the second truncated Gaussian filter to generate a second intermediate image; and up-sampling the second intermediate image to return it to a size approximately equal to the size of the image.

17. The method of claim 16, wherein the act of receiving a blur-value comprises receiving a user-specified blur-value.

18. The method of claim 16, wherein the act of determining a number of times to down-sample comprises selecting a value N, such that N is the largest value that satisfies the following equation $$V_{value} = \sum_{j=0} Vr^{2j}, \text{ where}$$

$V_{value}$ represents the blur-value, V represents the first variance, r represents a factor by which the image is reduced in size during each down-sample operation, and where j is an integer that runs from zero to N.

19. The method of claim 18, wherein the value of r is a value between approximately 2 and 8.

20. The method of claim 16, wherein the act of up-sampling comprises linearly interpolating the second intermediate image.

21. The method of claim 16, wherein the act of up-sampling comprises convolving the second intermediate image with a sinc-function filter.

22. The method of claim 16, wherein the first truncated Gaussian filter is truncated at a value equal to $\pm n\sigma$, where a represents the square-root of the variance and n is a real number in a specified range.

23. The method of claim 22, wherein the specified range is approximately 1 to 4.

24. The method of claim 16, wherein the act of down-sampling is performed by a graphics processing unit.

25. The method of claim 24, wherein the act of up-sampling is performed by the graphics processing unit.

26. The method of claim 16, wherein the first and second truncated Gaussian filters comprise a one-dimensional truncated Gaussian filters.

27. An image processing software application stored on a computer-readable medium comprising instructions for causing one or more programmable control devices to:
 obtain an image;
 receive a blur-value indicating an amount to blur the image;
 determine a number of times to down-sample the image with a first truncated Gaussian filter having a first variance, based on the blur-value;
 determine a second truncated Gaussian filter based on a second variance, the second variance being equal to the difference between the blur-value and the variance resulting from down-sampling the image the determined number of times;
 down-sample the image the determined number of times with the first truncated Gaussian filter to generate a first intermediate image;
 convolve the first intermediate image with the second truncated Gaussian filter to generate a second intermediate image; and
 up-sample the second intermediate image to return it to a size approximately equal to the size of the image.

28. The image processing software application of claim 27, wherein the instructions to determine a number of times to down-sample comprises instructions to select a value N, such that N is the largest value that satisfies the following equation $$V_{value} = \sum_{j=0} Vr^{2j}, \text{ where}$$

$V_{value}$ represents the blur-value, V represents the first variance, r represents a factor by which the image is reduced in size during each down-sample operation, and where j is an integer that runs from zero to N.

29. The image processing software application of claim 27, wherein the instructions to up-sample comprise instructions to linearly interpolate the second intermediate image.

30. The image processing software application of claim 27, wherein the instructions to down-sample comprise instructions to use a graphics processing unit.

31. The image processing software application of claim 29, wherein the instructions to up-sample comprise instructions to use the graphics processing unit.

* * * * *